Patented Nov. 19, 1929

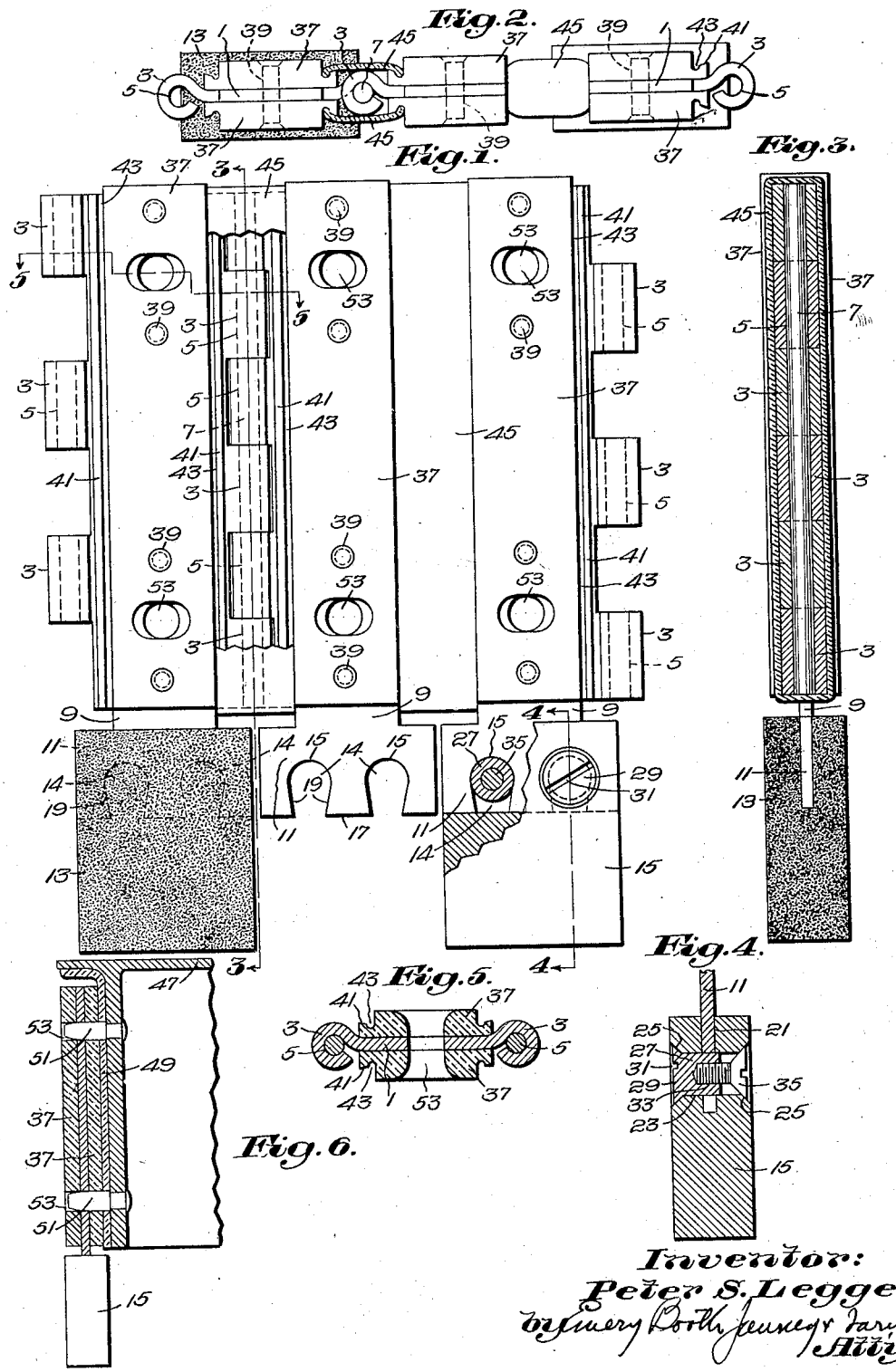

1,736,607

UNITED STATES PATENT OFFICE

PETER S. LEGGE, OF SOMERVILLE, MASSACHUSETTS

SAW

Application filed January 27, 1927. Serial No. 164,070.

My invention relates to saws, and particularly but not exclusively to one of the band saw type for sawing stone.

The invention will be best understood from the following description when read in the light of the accompanying drawings showing one specific embodiment of the invention, while the scope of the invention will be more particularly pointed out in the appended claims.

In the drawings:—

Fig. 1 is an elevation showing a section of the length of the saw with parts broken away;

Fig. 2 is a plan view of the saw according to Fig. 1 with parts broken away;

Figs. 3, 4 and 5 respectively are sections on the lines 3—3, 4—4, and 5—5 of Fig. 1; and Fig. 6 is a radial section through the rim of a pulley with the saw passing over it.

Referring to the drawings I have illustrated a saw in the form of a flat ribbon like chain, each link of which is formed of a plate 1 bent at opposite sides to form spaced eyes 3, the eyes at one side of said plate being staggered with relation to the eyes at the opposite side thereof so that the bores 5 of the eyes of adjacent links may be brought into registry with the ends of the eyes in abutting relation. Passing through the registering bores 5 of the eyes are shown pins 7 for forming hinge joints securing the links together in articulated relation.

At their lower ends the plates 1 are shown as provided with extensions 9 having heads 11, the latter carrying the cutting teeth, which teeth may be of any suitable shape and construction. The tooth indicated at 13 may, for example, be formed of carborundum grains mixed with a binder and molded about the head 11, after which it is baked to render it hard. Conveniently the heads 11 may be cut away to form openings 14 having the approximately semi-circular edges 15 connected with the lower edges 17 of the heads by the converging edges 19. The portions of the carborundum which enter the openings 14 rigidly secure the tooth to the head. The tooth indicated at 15 in Figs. 1 and 4 may be formed of steel, and as shown is provided with a slot 21 at its upper edge for receiving the head 11. Formed through the tooth 15 is shown a hole 23 which intersects the slot 21 and is countersunk at the opposite ends as indicated at 25. Extending into one end of the hole 25 is shown a member 27 having the flat head 29 which is slotted as indicated at 31 for receiving the screw engaging end of a screw driver. The diameter of the member 27 is such as to cause it snugly to fit the hole 23 and the semi-circular portion of the opening 14 in the head 11. For securing the member 27 in position the same is shown as formed with a screw threaded bore 33 which receives the shank of a flat head machine screw 35.

As illustrated each link between the eyes 3 and above the extension 9 is provided with a facing 37, which preferably is of resilient material such as rubber, secured to the plate by means of rivets 39. As shown the opposite side edges of the strips 37 are cut away to form the bevel surfaces 41 and grooves 43. About the hinge joints are shown bands of rubber 45 the edges of which, when the bands are under tension, engage with the bevel surfaces 41 and grooves 43 for holding said bands in position. In practice the bands serve to keep water, cuttings, and the like from entering the bearing surfaces of the hinges, without interfering with the operation of the hinges.

In Fig. 6 I have indicated the section of the rim of a pulley for driving or guiding a band saw constructed as above described. Conveniently the pulley, which may be of the form indicated at 47, has a facing 49 of yielding material, preferably rubber, and is provided with radially projecting pins 51 adapted to enter holes 53 formed through the facings 37 and plates 1. This construction permits the band saw to cut vertically without slipping off the pulley, while the rubber facing on the pulley and the rubber facing on the saw provide a yielding friction surface permitting the links to conform to the surface of the pulley.

It will be understood that within the scope of the invention wide deviations may be made from the specific embodiment thereof herein described without departing from the spirit of the invention.

Claims:

1. A saw comprising, in combination, a chain formed of thin plate like members and having a pulley engaging facing of resilient material, and cutting teeth carried by said members adapted to form a saw cut of greater width than the thickness of said chain.

2. A saw comprising, in combination, a chain formed of a series of thin plate like members each having a pulley engaging facing of resilient material and carrying a saw tooth.

3. A saw comprising a series of members, means at opposite sides of said members forming hinge joints for articulating one to the other, and means providing a flexible covering for said hinge joints for protecting the same from dirt.

4. A saw comprising a series of flat plate like members opposite sides of which are bent to form eyes for receiving a pin for connecting said members, and a band of rubber encircling the portions of said members presenting said eyes.

In testimony whereof, I have signed my name to this specification.

P. S. LEGGE.